2,169,191

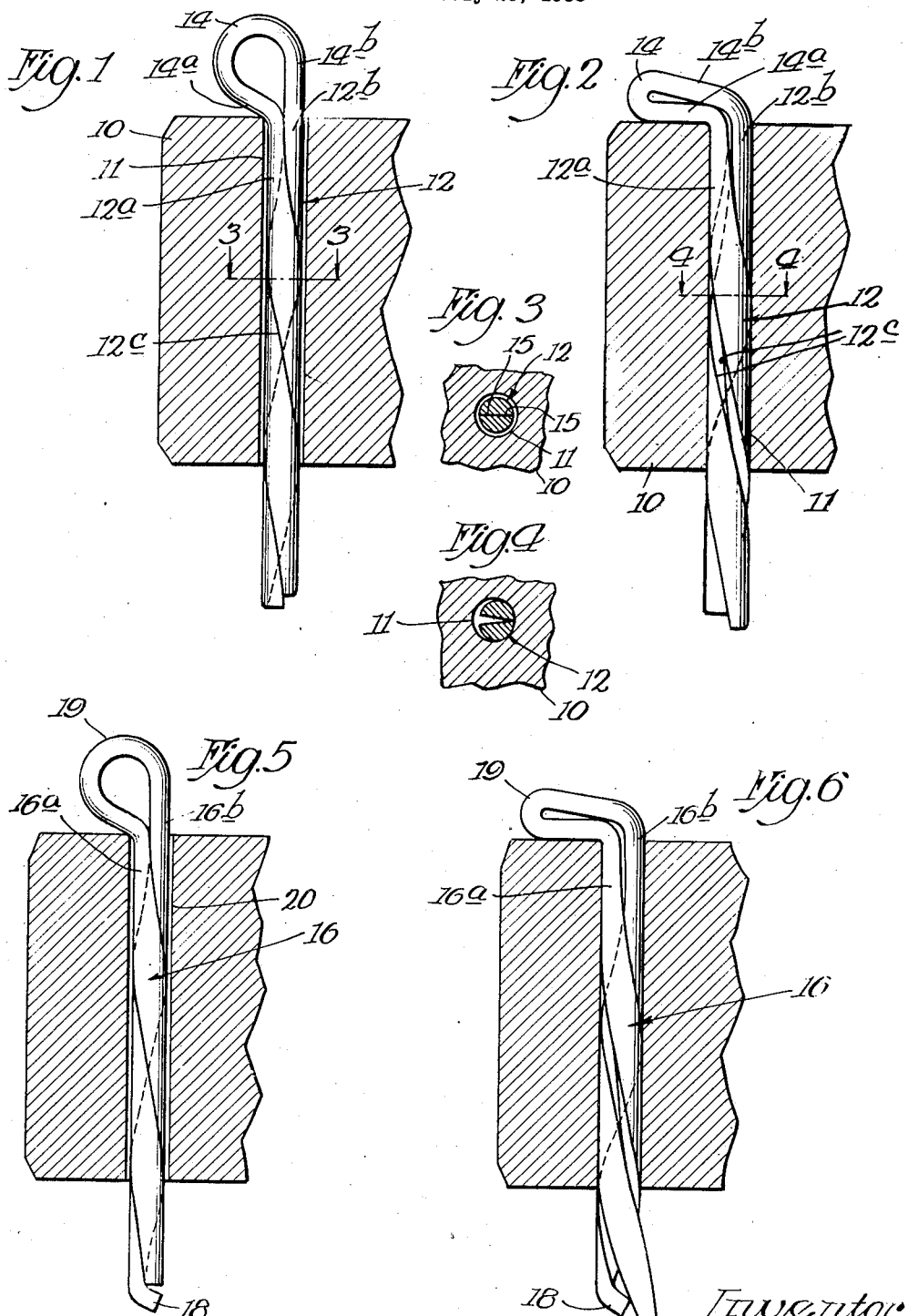
Aug. 8, 1939. M. A. SMITH 2,169,191
COTTER PIN
Filed July 23, 1938
Inventor
Malcolm A. Smith Patented Aug. 8, 1939

UNITED STATES PATENT OFFICE 2,169,191

COTTER PIN

Malcolm A. Smith, Hagerstown, Ind.

Application July 23, 1938, Serial No. 220,871

8 Claims. (Cl. 85—8.5)

My invention relates to cotter pins.

One of the objects of my invention is to provide an improved cotter pin which is of simple and inexpensive construction, is adapted to expand and fit tightly and uniformly in an opening when a driving force is applied thereto, will not tend to work loose in use, and which practically eliminates excess wear and shearing of the pin when it is subjected to vibrational and other working strains and stresses.

Another object is to provide a cotter pin having a helically twisted body with a deformable head thereon, the body consisting of a pair of abutting legs joined at one end by the head and adapted to be displaced relatively in longitudinal direction by applying a driving force to the head thereof to deform the same, the arrangement being such that when the legs are displaced longitudinally the engaged helical surfaces thereof act as cams to spread the legs apart and increase the diameter of the body throughout its length.

Still another object is to provide a cotter pin of the foregoing character having means at the ends of its legs opposite the head for additionally spreading apart the free ends of the legs upon movement of the legs relatively in longitudinal direction.

Other objects and advantages will become apparent as this description progresses, and by reference to the drawing wherein—

Figure 1 is a view partially in section illustrating one form of cotter pin embodying my invention applied to an opening in an object, the cotter pin being shown in its condition prior to the application of a driving force to deform the head thereof;

Fig. 2 is a view similar to Fig. 1, except showing the condition of the cotter pin after a driving force has been applied and the head deformed;

Fig. 3 is a section taken substantially on line 3—3 of Fig. 1;

Fig. 4 is a section taken substantially on line 4—4 of Fig. 2;

Fig. 5 is a view similar to Fig. 1, except illustrating a cotter pin having additional end spreading means; and Fig. 6 is a view similar to Fig. 2, except illustrating the cotter pin of Fig. 5 in secured condition.

In the drawing, I have shown my improved cotter pin as applied to an object 10 having an opening 11 therein. It is to be understood that the object 10 may take the form of any object to which a cotter pin is usually applied, such, for example, as a pin, bolt, shaft, stud or the like.

Referring to the cotter pin shown in Figs. 1 to 4, inclusive, it may be formed of a heavy wire-like material having a semi-circular cross section like that from which standard cotter pins are formed. In forming the cotter pin, the material may be bent upon itself in such a way as to provide a body 12 including a pair of legs 12$^a$ and 12$^b$ joined at one end by a looped head 14. The cotter pin material is so shaped that the flat sides 15 (Fig. 3) of the legs 12$^a$ and 12$^b$ face each other in abutting relation. After the material has been formed as above stated, the body 12, with the legs 12$^a$ and 12$^b$ as a unit, is given a helical twist from end to end providing complemental helical leg surfaces 12$^c$ in abutting relation.

The head 12 is so formed that its center is offset laterally from the center of the cotter pin body 12, and that the head part 14$^a$ connected to the leg 12$^a$ extends angularly from the leg 12$^a$ while the head part 14$^b$ extends substantially in alignment with the leg 12$^b$ so as to form, in effect, a continuation of such leg. The body 12 of the cotter pin is, preferably, of such diameter that it will freely enter the opening 11; and, when the cotter pin is fully entered into the opening, it is supported therein upon the cotter pin head portion 14$^a$.

In securing the cotter pin in the opening 11, it is only necessary to strike the head 14 with a hammer, or the like, sufficiently to apply a driving force thereto which will deform the same as shown in Fig. 2. When a driving force is thus applied to the pin head 14, the leg 12$^a$ is held substanially stationary since the head portion 14$^a$ is seated upon the surface of the object at the outer end of the opening 11, but the portion 14$^b$ of the head 14 and the leg 12$^b$ are free to and do move longitudinally of the pin body. When the leg 12$^b$ is thusly shifted longitudinally relatively to the leg 12$^a$, the engaged helical leg surfaces 12$^c$ ride along each other and act as cams which spread the legs 12$^a$ and 12$^b$ apart in a uniform manner substantially throughout the length of such legs (Fig. 2). In the foregoing action, the cotter pin body tends to spread to an extent slightly greater than the diameter of the opening 11 so that the cotter pin body 12 engages the wall of the opening 11 tightly and under tension. This engagement is substantially uniform throughout the length of the cotter pin body so that the cotter pin is initially fastened in the opening 11 without looseness and it is held under such tension that possibility of the cotter pin working loose when subjected to vibrational and other working strains and stresses is practically eliminated. This feature, in turn, reduces possible wear of the cotter pin to the very minimum and prevents cotter pin movement which would eventually result in shearing of the cotter pin.

The foregoing cotter pin arrangement well serves its intended purpose, but, in some instances, it may be desirable to provide an additional lock against endwise removal of the pin. This may be accomplished by the cotter pin structure shown in Figs. 5 and 6. Specifically, this cotter pin is provided with a body 16 similar to that previously described except that its leg 16ᵃ is somewhat longer than its leg 16ᵇ, and its leg 16ᵃ is provided with an end part 18 turned over the end of the leg 16ᵇ in the normal unapplied condition of the pin. This pin is further provided with a head 19 similar to the head 14 to which a driving force is applied in securing the cotter pin in its opening 20; and, when a driving force is applied to the head 19 and it is deformed as shown in Fig. 6, the leg 16ᵇ is moved longitudinally of the leg 16ᵃ thereby spreading apart the legs similarly to the legs 12ᵃ and 12ᵇ of Figs. 1 and 2. The leg 16ᵇ also, in moving longitudinally, moves along the inturned end 18 of the leg 16ᵃ, thereby additionally spreading apart the outer free ends of the legs 16ᵃ and 16ᵇ to an extent greater than the diameter of the opening 20 so that the pin is further locked against longitudinal displacement as a whole.

The operation and advantages of my invention will be obvious from the foregoing description. The cotter pin is not only of a very simple and inexpensive construction, but it is adapted to serve its extended purpose in a highly efficient manner.

I claim:

1. A cotter pin comprising a pair of legs twisted to provide thereon complemental helical surfaces extending throughout the length of each leg in abutting relation, a looped head connecting said legs at one end and being deformable to move said legs relatively in longitudinal direction and thereby cause said abutting helical leg surfaces to act as spreading cams that simultaneously and uniformly spread said legs substantially throughout their length.

2. A cotter pin comprising an elongated body adapted normally to fit freely in an opening in an object, said body being helically and uniformly twisted substantially throughout its length and including a pair of legs having abutting helical surfaces, a deformable head connecting said legs at one end, said head being so constructed and arranged that it is adapted to seat upon the object having the opening in which the cotter pin is to be inserted, and adapted to support one of said legs against movement and the other of said legs for longitudinal movement relative to the other legs when sufficient force is applied longitudinally to said head to deform the same.

3. A cotter pin comprising an elongated body which is helically twisted throughout in a uniform manner, said body including a pair of legs with helical abutting surfaces throughout their length, a loop-like deformable head connecting said legs at one end, the portion of said head connecting with one of said legs extending angularly therefrom and adapted to seat upon an object having a hole in which the pin is inserted, and the portion of said head connecting with the other of said legs extending substantially in alignment with its connecting leg, whereby said legs are shifted relatively in longitudinal direction and are spread apart when said head is deformed.

4. A cotter pin comprising an elongated body including a pair of legs each of which is twisted providing helical surfaces disposed normally in complemental abutting relation substantially throughout the length of said legs, and a head connecting said legs at one end, said head being deformable to move said legs and the helical abutting surfaces thereof relatively in longitudinal direction to spread apart said legs, said helical surfaces holding said legs in said spread apart condition.

5. A cotter pin adapted to be inserted in and locked in an opening in an object, which pin comprises an elongated body adapted normally to fit freely in the opening and helically twisted from one end to the other, said body being divided into a pair of legs having helical abutting surfaces extending from end to end thereof, a head connecting said legs at one end and deformable to move said legs relatively in longitudinal direction thereby causing said abutting helical surfaces to cam or spread said legs apart to snugly fit in the opening and to hold them so engaged in the opening, and means on the other or free end of one of said legs for additional spreading apart said other or free ends of said legs.

6. A cotter pin adapted to be inserted in and locked in an opening in an object, which pin comprises a looped head, a pair of legs adapted to be inserted in the opening with one end thereof projecting through the opening, said pair of legs being twisted as a unit thereby providing complemental abutting surfaces extending helically throughout the length of both said legs, said legs being connected together at one end by said looped head which is adapted to engage the object at one end of the opening and which is deformable to move said legs relatively in longitudinal direction whereby said helical surfaces act to spread apart said legs to fit the same snugly in the object opening and to hold said legs so spread apart, one of said legs having the end part thereof that projects through the opening turned over in the longitudinal path of the other of said legs to cause the projecting ends of said legs to additionally spread apart when said head is deformed.

7. A cotter pin comprising a pair of legs and a head in the form of a loop connecting said legs together at one end thereof, the opposite or free ends of said legs being twisted through approximately one complete turn relative to said connected ends, whereby to provide a helix between said connected and free ends of said legs.

8. A cotter pin comprising a body having a pair of legs, a loop-like head connecting said legs at one end with the other ends free, said legs being twisted about each other through a major portion of their length providing helical abutting surfaces along the twisted portion, said head being so constructed and arranged that when it is supported and deformed in a direction toward the free ends of said legs, one of said legs will move longitudinally relatively to the other leg, causing said abutting surfaces to spread said legs apart transversely.

MALCOLM A. SMITH.